US012763274B2

(12) United States Patent
Spibey et al.

(10) Patent No.: US 12,763,274 B2
(45) Date of Patent: Oct. 13, 2026

(54) ELECTRICAL ASSEMBLY

(71) Applicant: GENERAL ELECTRIC TECHNOLOGY GMBH, Baden (CH)

(72) Inventors: Neil Stuart Spibey, Stafford (GB); Dario Bergamo, Venice (IT); Eros Stella, Venice (IT); Philip Stephen Jones, Stafford (GB); Michael Evans, Stafford (GB); Ashley Smith, Stafford (GB); Matthew Robert Orford, Stafford (GB)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 671 days.

(21) Appl. No.: 18/262,274

(22) PCT Filed: Feb. 3, 2022

(86) PCT No.: PCT/EP2022/052619
§ 371 (c)(1),
(2) Date: Jul. 20, 2023

(87) PCT Pub. No.: WO2022/171520
PCT Pub. Date: Aug. 18, 2022

(65) Prior Publication Data

US 2024/0074079 A1 Feb. 29, 2024

(30) Foreign Application Priority Data

Feb. 9, 2021 (EP) .................................... 21275016

(51) Int. Cl.
*H01H 31/00* (2006.01)

(52) U.S. Cl.
CPC ................................ *H01H 31/003* (2013.01)

(58) Field of Classification Search
CPC .......... H01H 31/003; H01H 1/44; H01H 3/24; H01H 3/26; H01H 9/16; H01H 15/06;
(Continued)

(56) References Cited

U.S. PATENT DOCUMENTS 2,891,129 A * 6/1959 Foti ........................ H01H 33/14 218/4
3,504,142 A * 3/1970 Mckinnon .............. H01H 31/04 200/48 CB (Continued)

FOREIGN PATENT DOCUMENTS

CN 1269591 A * 10/2000 ........... H01H 33/666
CN 102132372 B * 4/2016 ............. H01H 35/14

(Continued)

OTHER PUBLICATIONS

WO2015172827A1 Grounding System (Machine Translation) (Year: 2015).*

(Continued)

*Primary Examiner* — M Baye Diao
(74) *Attorney, Agent, or Firm* — Eversheds Sutherland (US) LLP

(57) ABSTRACT

An electrical assembly including a grounding mechanism and an electrical device, the grounding mechanism including a support longitudinal member and a switch contact member, the switch contact member arranged in or on the support longitudinal member, the switch contact member configured to be connected in use to ground, the electrical device including an electrical terminal, wherein the support longitudinal member is configured to be slidable between: a first position in which the switch contact member is separated from the electrical terminal so that the switch contact member is electrically disconnected from the electrical device and a second position in which the switch contact member is in contact with the electrical terminal so that the
(Continued)

switch contact member is electrically connected to the electrical device.

12 Claims, 13 Drawing Sheets

(58) Field of Classification Search
CPC ....... H01H 31/08; H01H 31/10; H02M 1/322; H02M 7/003; H02M 7/4835
USPC ........................................................ 320/166
See application file for complete search history.

(56) References Cited

U.S. PATENT DOCUMENTS

| | | | | | |
|---|---|---|---|---|---|
| 3,858,176 | A * | 12/1974 | Miller | B60Q 1/343 200/61.54 |
| 4,272,798 | A * | 6/1981 | Merola | H02B 11/24 361/617 |
| 6,866,527 | B2 * | 3/2005 | Potega | H01R 24/58 439/668 |
| 7,317,261 | B2 * | 1/2008 | Rolt | B64U 10/60 290/55 |
| 8,081,415 | B2 * | 12/2011 | Nolletti | H02G 13/00 361/219 |
| 2018/0375424 | A1 | 12/2018 | Kim et al. | |

FOREIGN PATENT DOCUMENTS

| | | | | |
|---|---|---|---|---|
| EP | 3236484 | A1 | 10/2017 | |
| JP | 2007150110 | A * | 6/2007 | H05K 5/03 |
| WO | WO-2015172827 | A1 * | 11/2015 | H01R 4/66 |
| WO | WO-2018188750 | A1 * | 10/2018 | H01H 31/003 |

OTHER PUBLICATIONS

WO2018188750A1 Arrangement for a Power System (Machine Translation) (Year: 2018).*
International Search Report and Written Opinion for PCT/EP2022/052619, dated May 20, 2022, 13 pages.
European Search Report and Opinion for EP 21275016.0, dated Jul. 29, 2021, 7 pages.

* cited by examiner

ELECTRICAL ASSEMBLY

TECHNICAL FIELD

This invention relates to an electrical assembly comprising a grounding mechanism and an electrical device, preferably for use in medium voltage and high voltage power applications.

BACKGROUND OF THE INVENTION

An electrical equipment may include a grounding connection that is operable to selectively connect the electrical equipment to ground. This permits the electrical equipment to be discharged to ground potential, thus ensuring the safety of a nearby user or operator that is required to approach or handle the electrical equipment.

SUMMARY OF THE INVENTION

According to an aspect of the invention, there is provided an electrical assembly comprising a grounding mechanism and an electrical device, the grounding mechanism including a support longitudinal member and a switch contact member, the switch contact member arranged in or on the support longitudinal member, the switch contact member configured to be connected in use to ground, the electrical device including an electrical terminal, wherein the support longitudinal member is configured to be slidable between: a first position in which the switch contact member is separated from the electrical terminal so that the switch contact member is electrically disconnected from the electrical device; and a second position in which the switch contact member is in contact with the electrical terminal so that the switch contact member is electrically connected to the electrical device.

The inclusion of the grounding mechanism in the electrical assembly of the invention provides a way of switching the electrical device between grounded and ungrounded modes in a manner that imparts at least the following benefits.

The arrangement of the switch contact member in or on the support longitudinal member makes it straightforward to adapt its sliding motion to ensure sufficient electrical isolation between the switch contact member and the electrical terminal when grounding is not required, and readily enable the movement of the switch contact member to come into contact with the electrical terminal when grounding is required. This results in a robust grounding mechanism that enables the electrical device to be discharged safely without causing a dangerous failure of the electrical assembly.

In addition, the provision of the support longitudinal member sliding between the first and second positions provides a highly visible and accurate representation of the status of the open or closed position of the switch contact member. This in turn enables an operator to visually check from a safe distance whether the electrical device is grounded before approaching the electrical device.

Also, by arranging the switch contact member to be in or on the support longitudinal member, it becomes straightforward to remove the grounding mechanism from the electrical device prior to maintenance or repair, because the switch contact member is attached to the support longitudinal member. For the same reason, it is also straightforward to reinstall the grounding mechanism on the electrical device after completing the maintenance or repair. This advantageously reduces the overall time spent by the electrical device in an offline mode, which not only reduces inconvenience to an end user but also improves the productivity of the associated electrical application.

In embodiments of the invention, the electrical assembly may include an actuator configured to be operable to selectively apply a driving force to the support longitudinal member so as to slide the support longitudinal member between the first and second positions.

The provision of the actuator provides a reliable means of sliding the support longitudinal member between the first and second positions. The actuator may be configured to be manually or automatically operated, may be configured to be a mechanical, hydraulic or pneumatic actuator, and may also be configured to be operated by a local or remote operator or controller.

The configuration of the grounding mechanism of the invention allows fora modular design approach especially when used in conjunction with a plurality of electrical devices. For example, the grounding mechanism may have a different number of switch contact members to match the number of electrical devices, or have a different number of support longitudinal members depending on the construction and layout of the electrical devices.

In further embodiments of the invention, the electrical assembly may include a plurality of electrical devices, the grounding mechanism including a plurality of switch contact members, each switch contact member arranged in or on the support longitudinal member, each switch contact member configured to be connected in use to ground, each electrical device including an electrical terminal, wherein the support longitudinal member is slidable between: a first position in which each switch contact member is separated from a respective one of the electrical terminals so that each switch contact member is electrically disconnected from the respective electrical device; and a second position in which each switch contact member is in contact with the respective electrical terminal so that each switch contact member is electrically connected to the respective electrical device.

The arrangement of multiple switch contact members in or on the support longitudinal member enables a single sliding motion of the support longitudinal member to facilitate the ungrounding and grounding of multiple electrical devices, which may form part of the same electrical apparatus or may form part of different electrical apparatus but are in close proximity to each other. This in turns permits simultaneous discharging of multiple electrical devices, which is more time-efficient in comparison to discharging the electrical devices one at a time.

In still further embodiments of the invention, the electrical assembly may include a plurality of electrical devices, the grounding mechanism including a plurality of support longitudinal members and a plurality of switch contact members, each switch contact member arranged in or on a respective one of the support longitudinal members, each switch contact member configured to be connected in use to ground, each electrical device including an electrical terminal, wherein each support longitudinal member is configured to be slidable between: a respective first position in which the corresponding switch contact member is separated from a respective one of the electrical terminals so that the corresponding switch contact member is electrically disconnected from the respective electrical device; and a second position in which the corresponding switch contact member is in contact with the respective electrical terminal so that the corresponding switch contact member is electrically connected to the respective electrical device.

It will be understood that each of the plurality of support longitudinal members may have a single switch contact member or multiple switch contact members arranged therein or thereon.

The arrangement of one or more switch contact members in or on each of the plurality of support longitudinal members enables separate or concurrent sliding motions of the support longitudinal members to facilitate the grounding and ungrounding of multiple electrical devices, which may form part of the same electrical apparatus or may form part of different electrical apparatus but are in close proximity to each other. Furthermore, the use of multiple support longitudinal members enables the grounding mechanism of the invention to be used with various constructions and layouts of the multiple electrical devices, e.g. the electrical terminals being positioned at different heights, the electrical devices being arranged at different distances relative to each other, the electrical devices being arranged along a straight line or in a staggered fashion.

In embodiments of the invention employing the use of a plurality of support longitudinal members, the grounding mechanism may include at least one link member configured to couple a respective one of the plurality of support longitudinal members to a respective other of the plurality of support longitudinal members so that the coupled support longitudinal members are simultaneously slidable between their respective first and second positions.

Using at least one link member for coupling multiple support longitudinal members enables the coupled support longitudinal members to be slidable between their respective first and second positions using a single sliding motion, which enables the simultaneous discharging of multiple electrical devices to ground potential.

Multiple link members may be employed to form a chain of support longitudinal members for grounding and ungrounding multiple electrical devices, which for example may be arranged along a straight line.

Optionally the or each link member may include a link section that is configured to be adjustable in length so as to modify the distance between the coupled support longitudinal members.

The provision of a link section with an adjustable length in the or each link member enables the coupling of multiple support longitudinal members to accommodate positional tolerances of the electrical devices that may arise during, for example, installation of the electrical devices, and dimensional tolerances of the electrical devices that may arise due to, for example, manufacturing differences or thermal expansion. This also removes the costly and time-consuming need to redesign or modify each support longitudinal member to accommodate positional and dimensional tolerances of the electrical devices, thus permitting the use of support longitudinal members with identical or near-identical configurations.

In embodiments of the invention, the electrical terminal may include an electrical terminal portion configured to extend through a longitudinal slot in the support longitudinal member so that the electrical terminal portion is slidable within the longitudinal slot, and the longitudinal slot may be arranged to guide a sliding movement of the electrical terminal portion into and out of contact with the switch contact member. This provides one way of sliding the switch contact member into and out of contact with the electrical terminal.

The configuration of the or each support longitudinal member may vary so long as the or each switch contact member is arranged in or on the support longitudinal member, and the or each support longitudinal member is configured to be slidable between its first and second positions. In a preferred embodiment of the invention, the support longitudinal member may be in the form of a bar, rod or beam. The support longitudinal member is preferably made of an insulating material, such as fibreglass.

In embodiments of the invention, the switch contact member may include two contact member limbs arranged to be spaced apart to receive the electrical terminal so that the contact member limbs are arranged on opposing sides of the electrical terminal when the switch contact member is in contact with the electrical terminal.

The provision of the contact member limbs in the switch contact member permits the connection and disconnection of the switch contact member and the electrical terminal in a manner that is compatible with the sliding movement of the support longitudinal member between the first and second positions.

In further embodiments of the invention, a contact portion of the switch contact member may be dimensioned to be wider than the electrical terminal. This enables the switch contact member to accommodate the effects of thermal expansion and/or positional tolerances of the electrical devices and to endure a minimum of 1000 open-close cycles whilst maintaining a reliable connection to ground.

In still further embodiments of the invention, the switch contact member may be resiliently configured to urge the switch contact member towards the electrical terminal when the support longitudinal member is in the second position. Such configuration of the switch contact member not only improves the contact between the switch contact member and the electrical terminal, but also ensures that the switch contact member continues to be able to establish and maintain contact with the electrical terminal even after a high number of open-close cycles.

It will be appreciated that the invention is applicable to any type of electrical equipment that can be discharged to ground.

In a preferred embodiment of the invention, the electrical device may be an energy storage device. In a further preferred embodiment of the invention, the energy storage device may be a capacitor, preferably a capacitor of a chain-link module. The chain-link module includes a plurality of module switching elements and at least one energy storage device, the plurality of module switching elements and the or each energy storage device in each such chain-link module being arranged to be combinable to selectively provide a voltage source.

The invention may be used to safely discharge a capacitor to ground potential so as to allow maintenance or repair of the capacitor, or any electrical equipment associated with or located in the vicinity of the capacitor.

As specified above, the configuration of the grounding mechanism of the invention allows for a modular design approach especially when used in conjunction with a plurality of electrical devices. The same modular design approach is beneficial when applied to the grounding of a large number of capacitors.

It will be appreciated that the use of the terms "first" and "second", and the like, in this patent specification is merely intended to help distinguish between similar features (e.g. the first and second positions), and is not intended to indicate the relative importance of one feature over another feature, unless otherwise specified.

BRIEF DESCRIPTION OF THE DRAWING

A preferred embodiment of the invention will now be described, by way of a non-limiting example, with reference to the accompanying drawings in which.

The figures are not necessarily to scale, and certain features and certain views of the figures may be shown exaggerated in scale or in schematic form in the interests of clarity and conciseness.

DETAILED DESCRIPTION

The following embodiment of the invention is used primarily in high voltage direct current (HVDC) applications, but it will be appreciated that the following embodiment of the invention is applicable mutatis mutandis to other applications operating at different voltage levels. It will be further appreciated that the following embodiment of the invention is described with reference to a capacitor of a chain-link module, but is applicable mutatis mutandis to other types of electrical devices, in particular energy storage devices, that may be discharged to ground.

Figure 1:
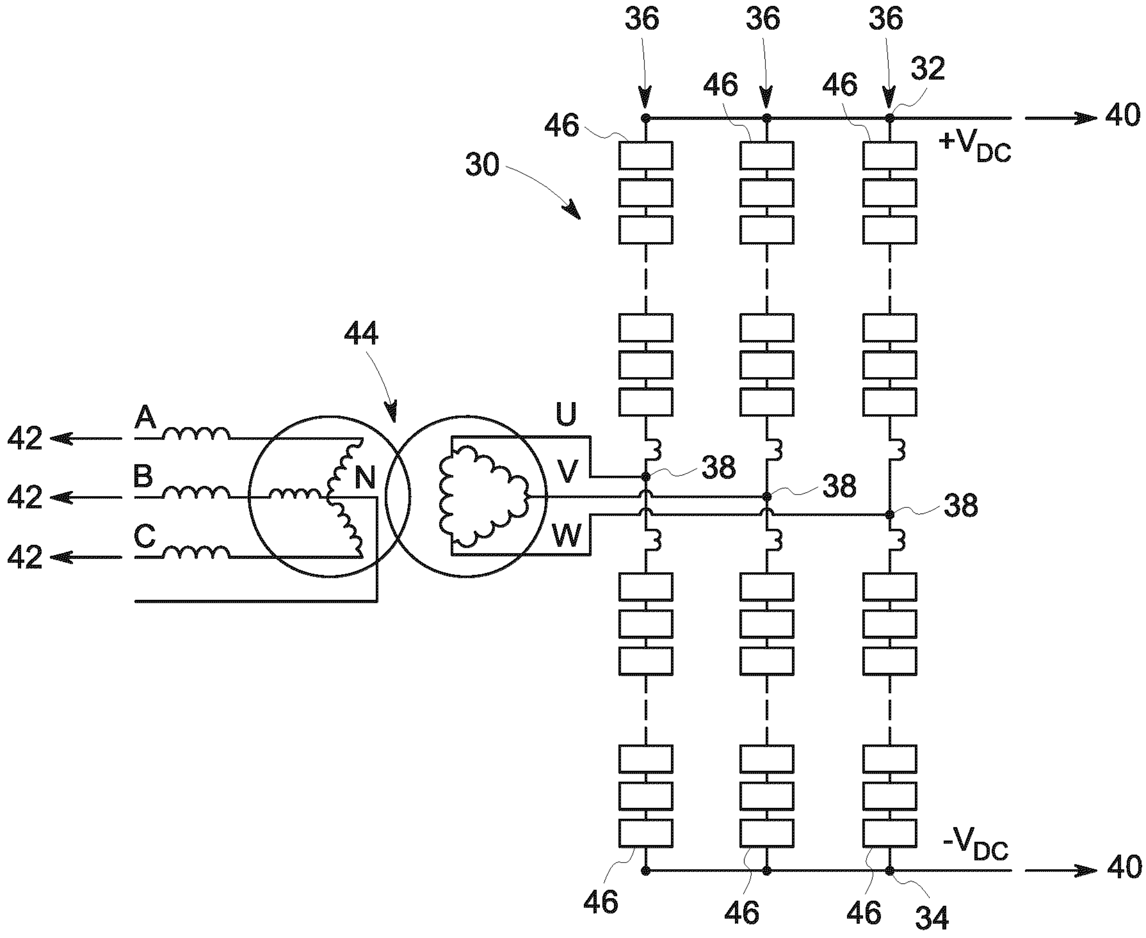
FIG. 1 schematically shows a voltage source converter.

FIG. 1 shows an AC-DC voltage source converter arrangement.

The voltage source converter arrangement includes a voltage source converter 30. The voltage source converter 30 includes first and second DC terminals 32,34 and a plurality of converter limbs 36. Each converter limb 36 extends between the first and second DC terminals 32,34 and includes first and second limb portions separated by a respective AC terminal 38. In each converter limb 36, the first limb portion extends between the first DC terminal 32 and the AC terminal 38, while the second limb portion extends between the second DC terminal 34 and the AC terminal 38.

In use, the first and second DC terminals 32,34 of the voltage source converter 30 are connected to a DC network 40. In use, the AC terminal 38 of each converter limb 36 of the voltage source converter 30 is connected to a respective AC phase of a three-phase AC network 42 via a star-delta transformer arrangement 44.

Each limb portion includes a chain-link converter 46 that is defined by a plurality of series-connected chain-link modules 48. Each chain-link module 48 includes a plurality of module switching elements 50 and at least one capacitor 52, the plurality of module switching elements 50 and the or each capacitor 52 in each such chain-link module 48 being arranged to be combinable to selectively provide a voltage source.

Figure 2:
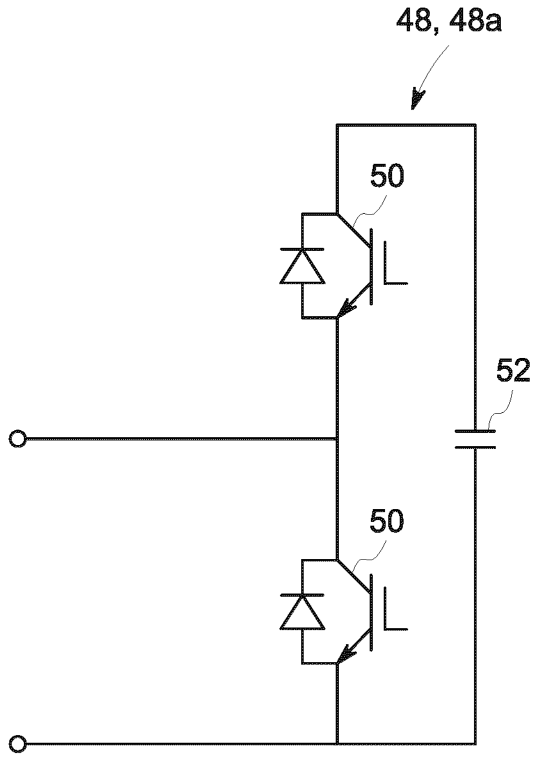
FIGS. 2 and 3 schematically show chain-link modules for use in the voltage source converter of FIG. 1.

FIG. 2 shows schematically the structure of an exemplary half-bridge chain-link module 48*a*. The half-bridge chain-link module 48*a* includes a pair of module switching elements 50 and a capacitor 52. The pair of module switching elements 50 are connected in parallel with the capacitor 52 in a half-bridge arrangement to define a 2-quadrant unipolar module that can provide zero or positive voltage and can conduct current in both directions.

Figure 3:
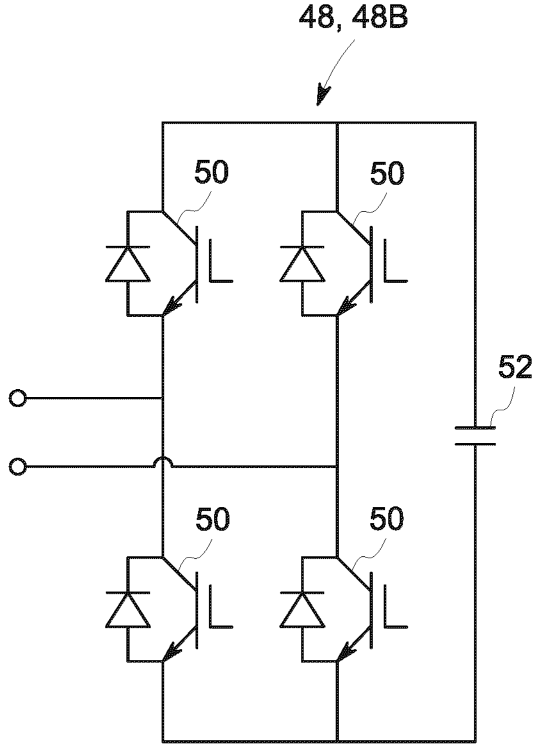

FIG. 3 shows schematically the structure of an exemplary full-bridge chain-link module 48*b*. The full-bridge chain-link module 48*b* includes two pairs of module switching elements 50 and a capacitor 52. The pairs of module switching elements 50 are connected in parallel with the capacitor 52 in a full-bridge arrangement to define a 4-quadrant bipolar module that can provide negative, zero or positive voltage and can conduct current in both directions.

Each module switching element 48 is in the form of an insulated gate bipolar transistor (IGBT) which is connected in parallel with an anti-parallel diode. It is envisaged that, in other embodiments of the invention, each IGBT may be replaced by a gate turn-off thyristor, a field effect transistor, an injection-enhanced gate transistor, an integrated gate commutated thyristor or any other self-commutated semiconductor device. It is also envisaged that, in other embodiments of the invention, each diode may be replaced by a plurality of series-connected diodes.

The capacitor 52 of each chain-link module 48 is selectively bypassed or inserted into the corresponding chain-link converter 46 by changing the states of the module switching elements 50. This selectively directs current through the capacitor 52 or causes current to bypass the capacitor 52, so that the chain-link module 48 provides a zero or positive voltage in the case of the half-bridge chain-link module 48*a*, and a negative, zero or positive voltage in the case of the full-bridge chain-link module 48*b*.

It is possible to build up a combined voltage across each chain-link converter 46, which is higher than the voltage available from each of its individual chain-link modules 48, via the insertion of the capacitors 52 of multiple chain-link modules 48, each providing its own voltage, into each chain-link converter 46. In this manner switching of the module switching elements 50 in each chain-link module 48 causes each chain-link converter 46 to provide a stepped variable voltage source, which permits the generation of a voltage waveform across each chain-link converter 46 using a step-wise approximation. Hence, the module switching elements 50 in each limb portion are switchable to selectively permit and inhibit flow of current through the corresponding capacitor 52 in order to control a voltage across the corresponding limb portion. This in turn permits the use of the voltage source converter 30 to transfer power between the DC and AC networks 40,42 through switching of the module switching elements 50 of the chain-link modules 48 to provide a stepped variable voltage source and thereby generate a voltage waveform so as to control the configuration of an AC voltage waveform at the corresponding AC terminal 36 to facilitate the transfer of power between the DC and AC networks 40,42.

Depending on the power transfer requirements of the AC-DC voltage source converter arrangement, the number of chain-link modules 48 in each limb portion may number in the hundreds, and the maximum voltage level of the capacitor 52 in each chain-link module 48 may be up to several kV.

Maintenance or repair of the chain-link modules 48 may be required from time to time, which requires an operator to approach or handle a given chain-link module 48. To ensure the safety of the operator, the capacitors 52 of the chain-link modules 48 must be discharged to lower their voltage levels. However, there are challenges in carrying out such maintenance or repair due to the large number of capacitors 52 that require discharging, the high voltages between the capacitors 52, the high voltages between different sections of each chain-link converter 46, and the large amount of energy stored in each capacitor 52.

Furthermore, the French national standard NFC 18 510 requires the discharging of all capacitors 52 in the voltage source converter 30 to ground potential.

Figure 4:
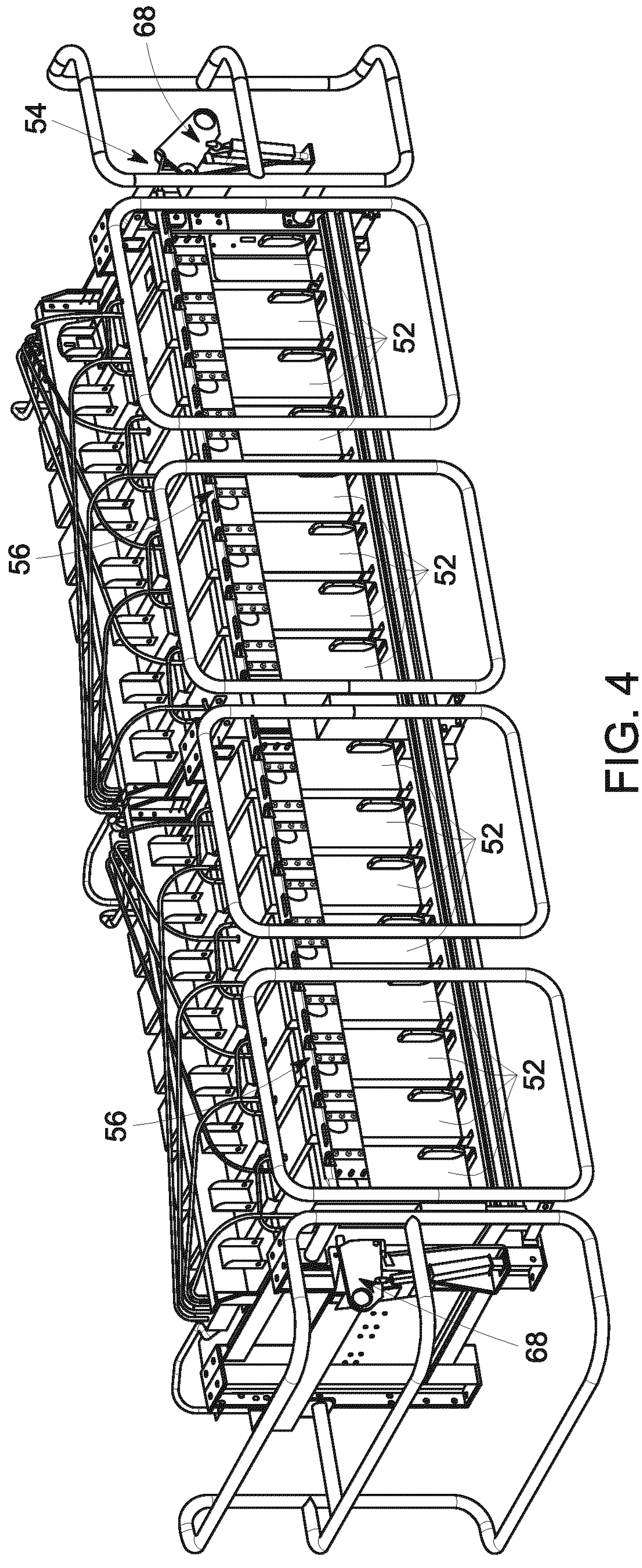
FIGS. 4 to 6 show an electrical assembly according to an embodiment of the invention.
Figure 5:
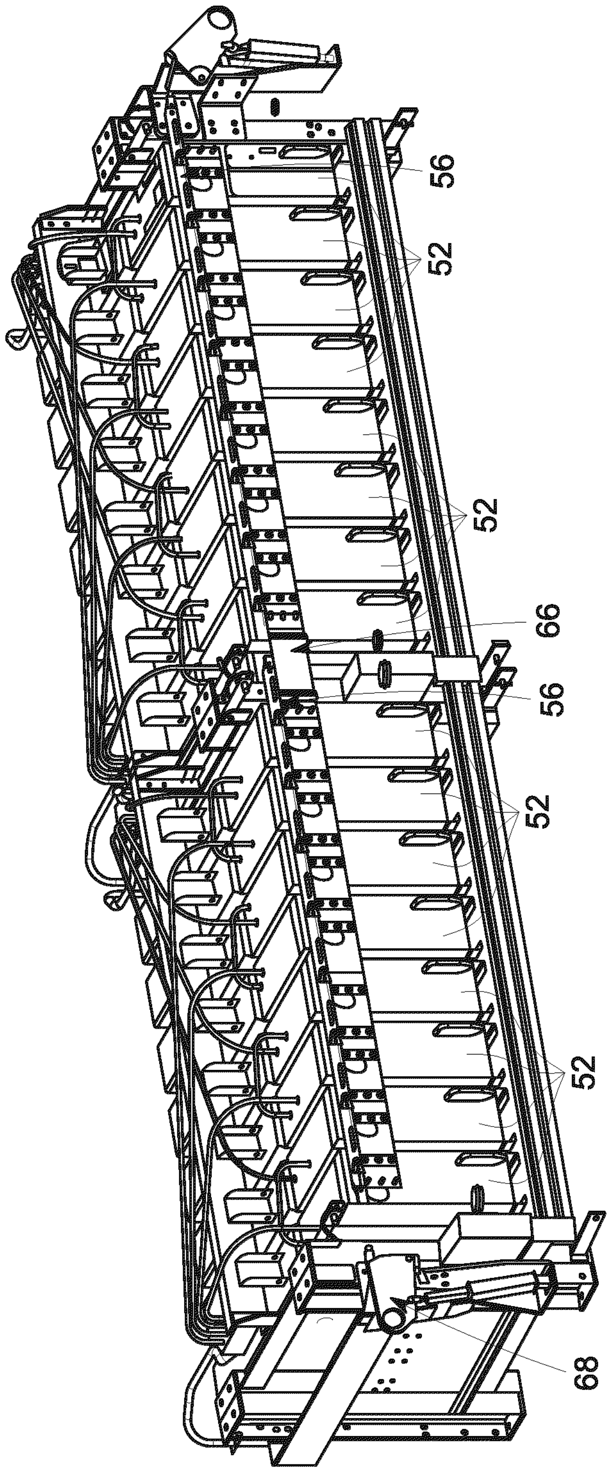
Figure 6:
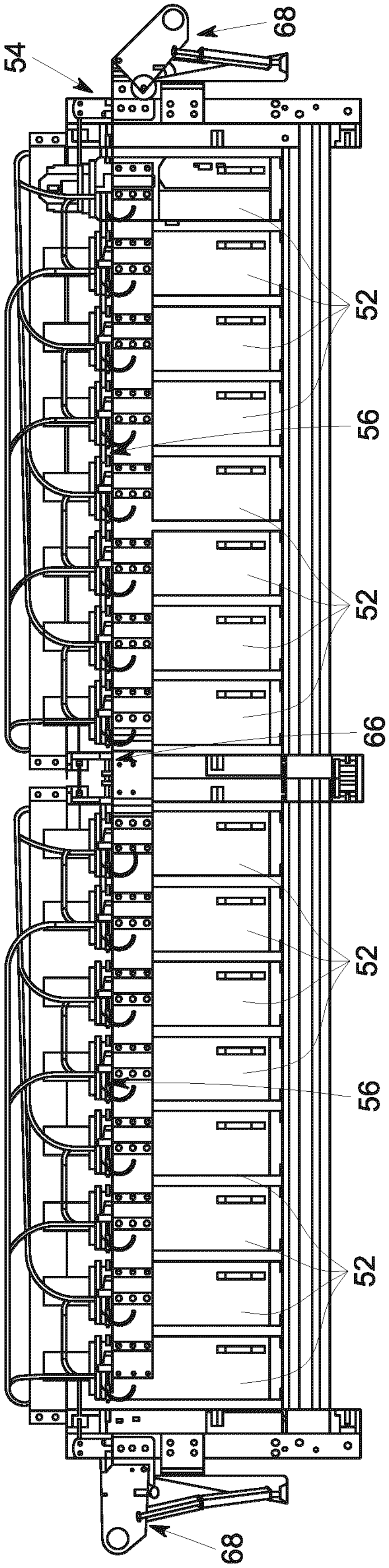
Figure 7:
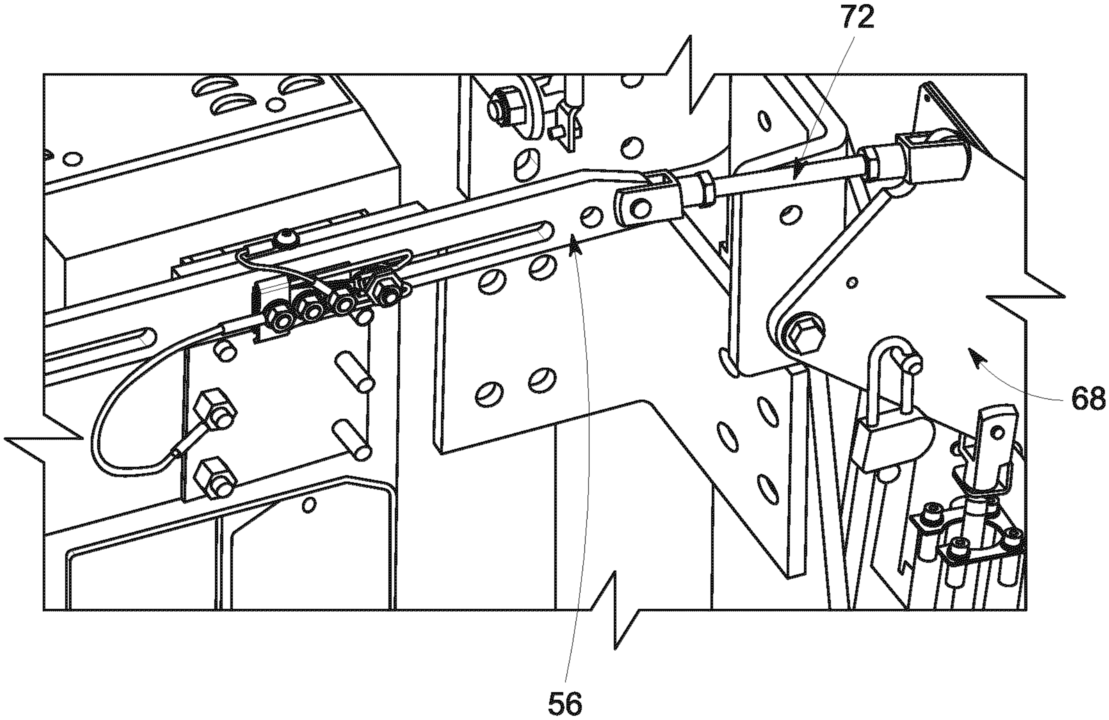
FIGS. 7 to 18 show components of the electrical assembly of FIGS. 4 to 6.
Figure 8:
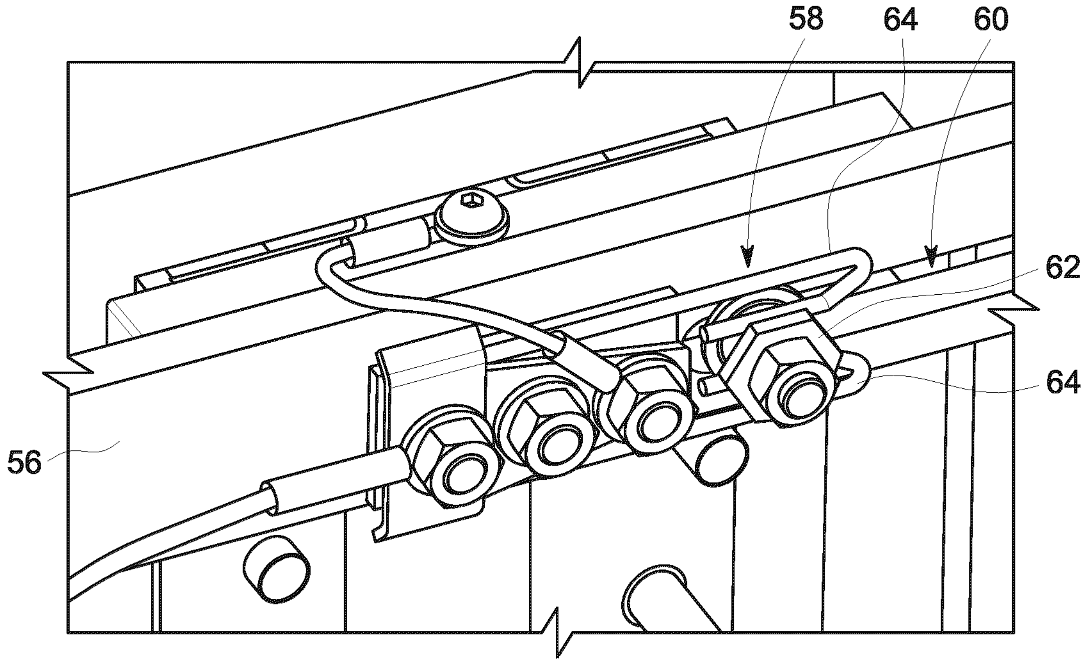
Figure 9:
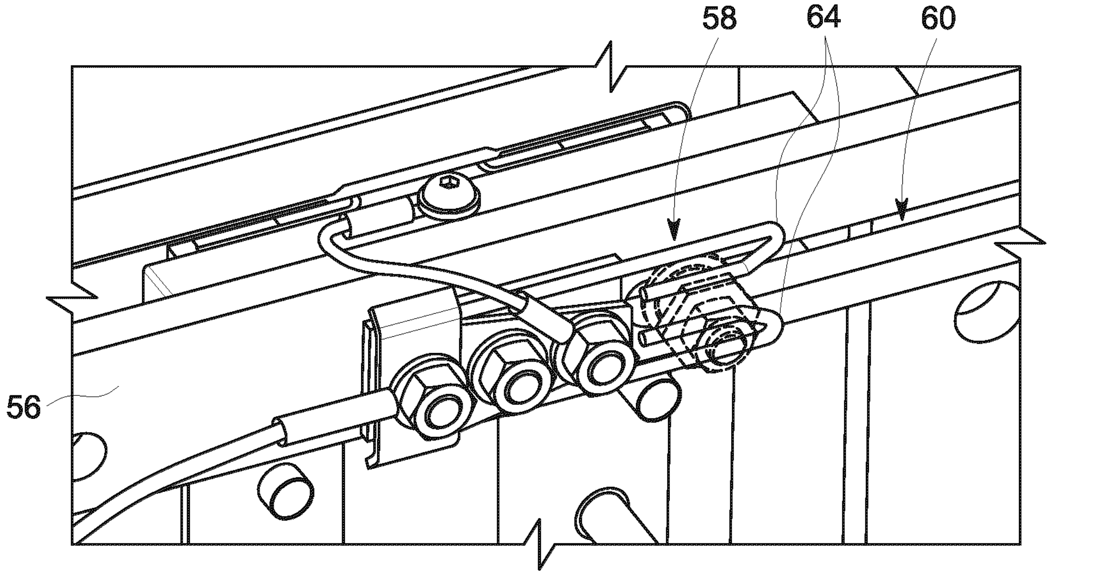
Figure 10:
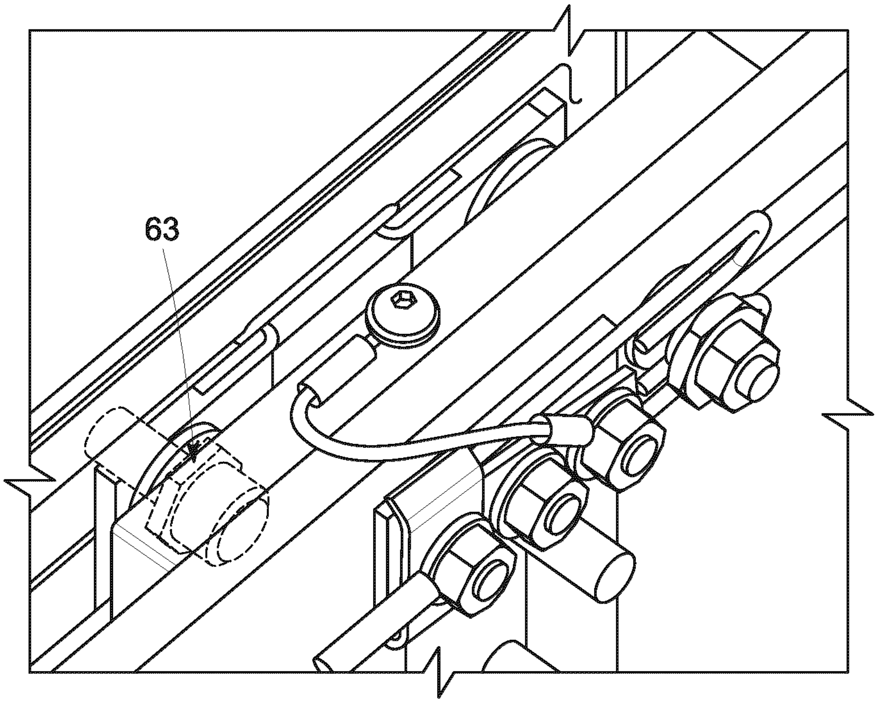
Figure 11:
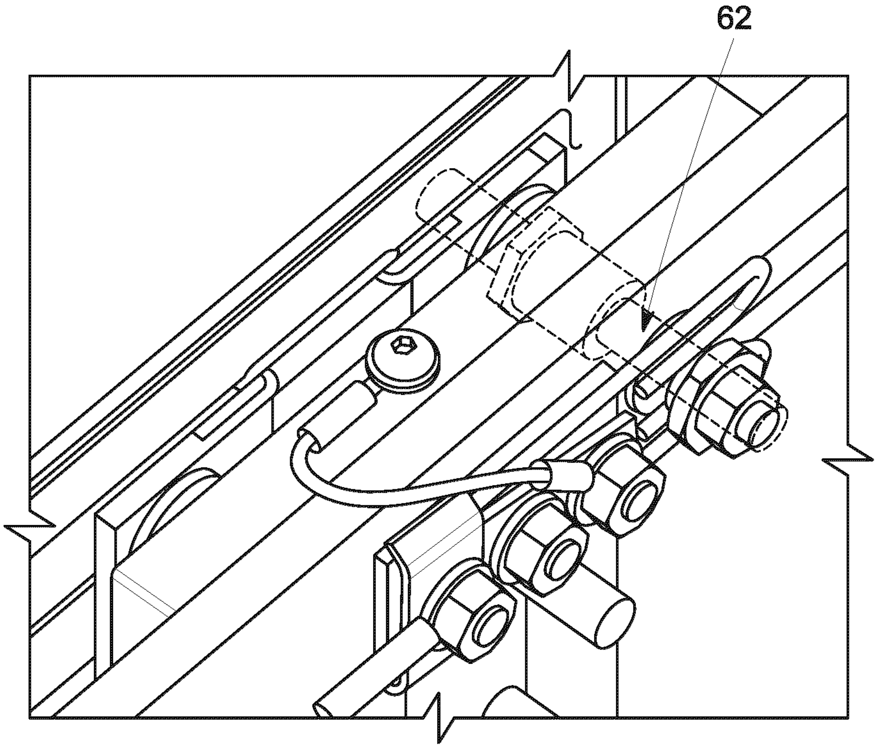
Figure 12:
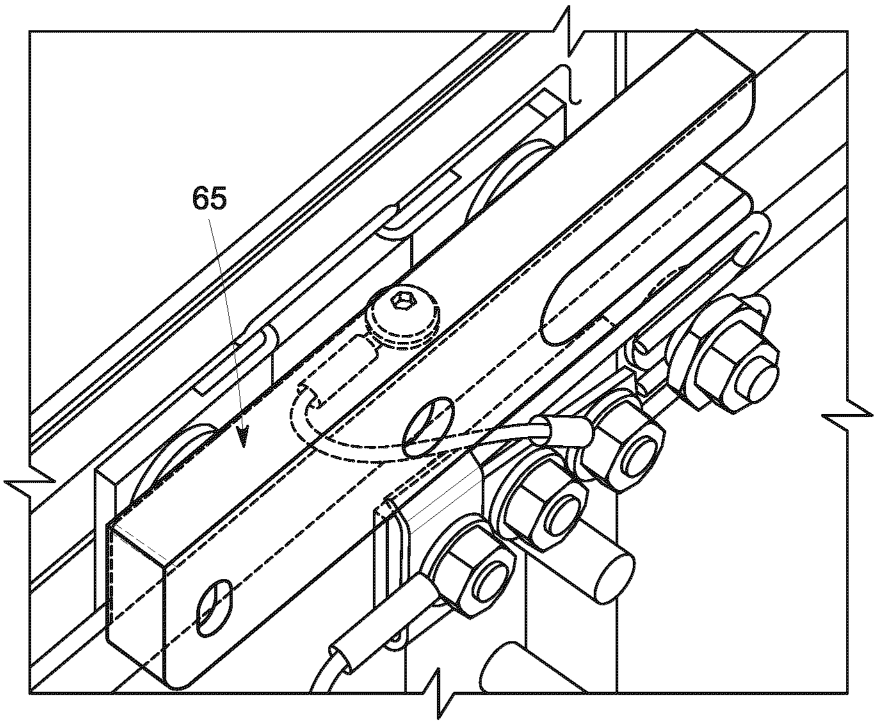
Figure 13:
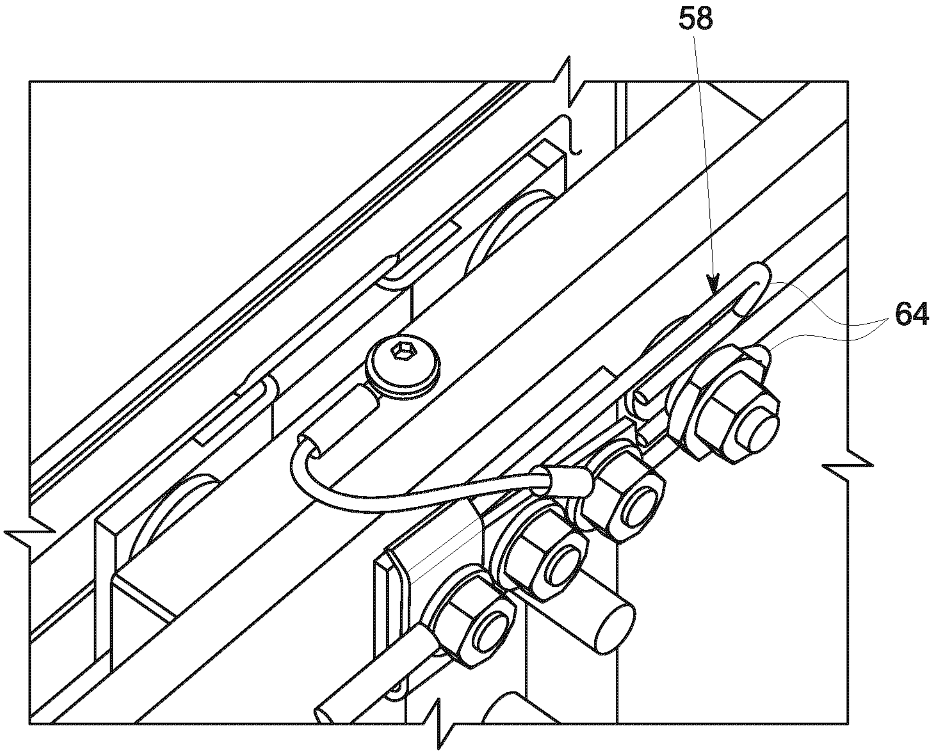
Figure 14:
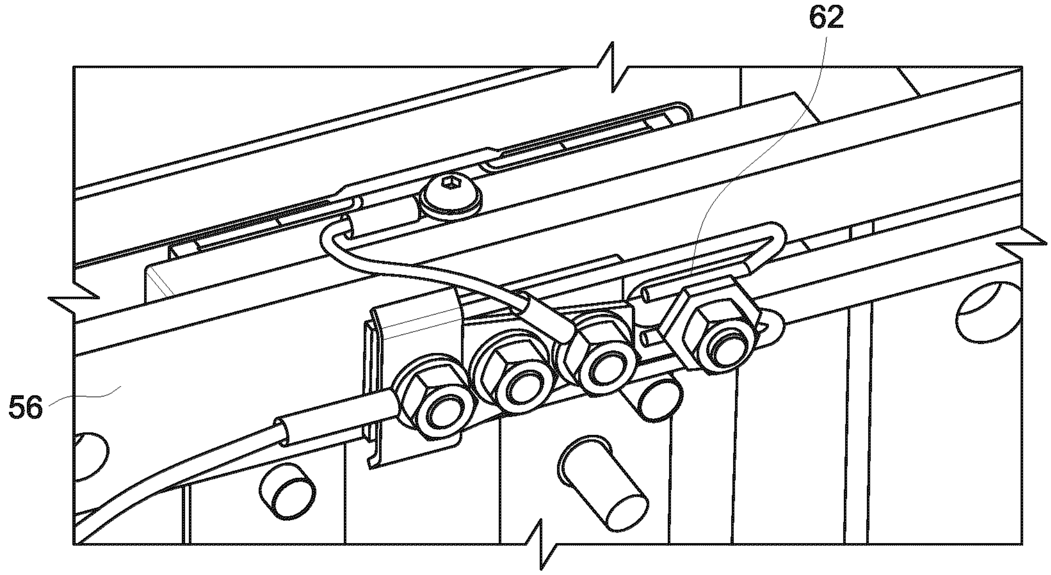
Figure 15:
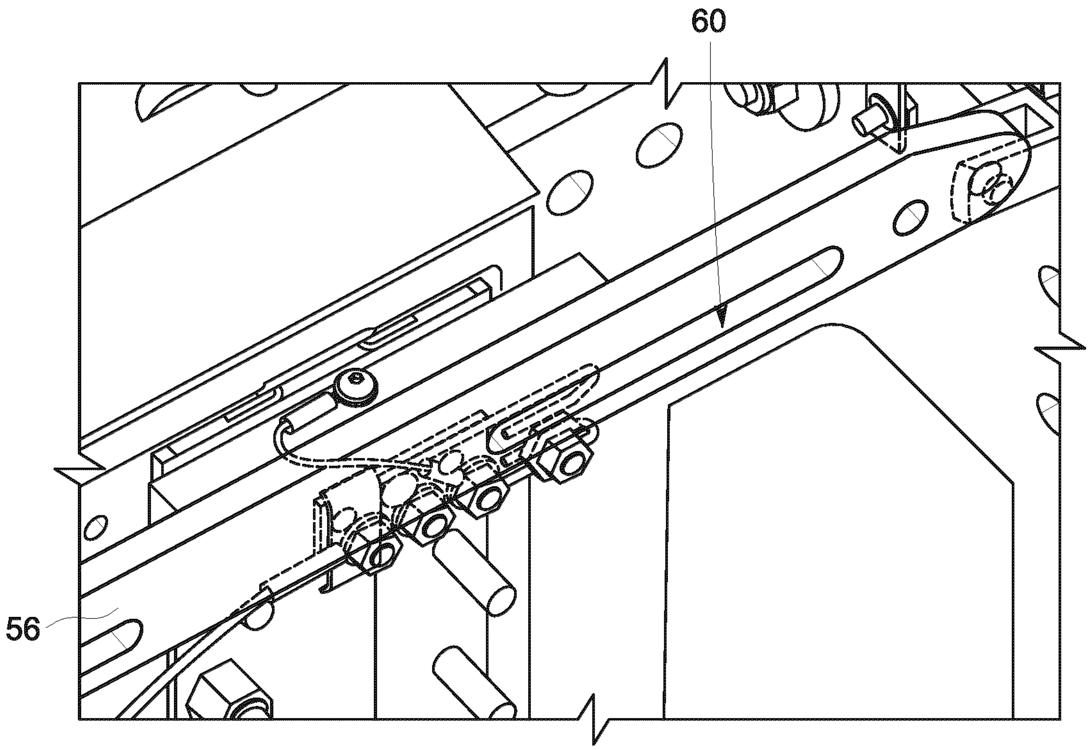
Figure 16:
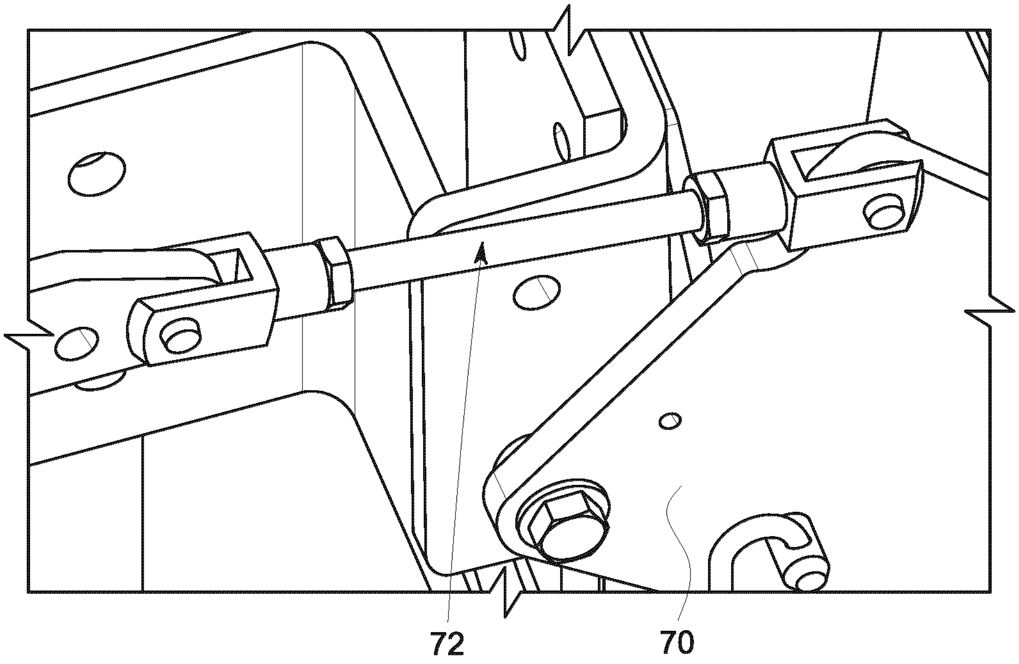
Figure 17:
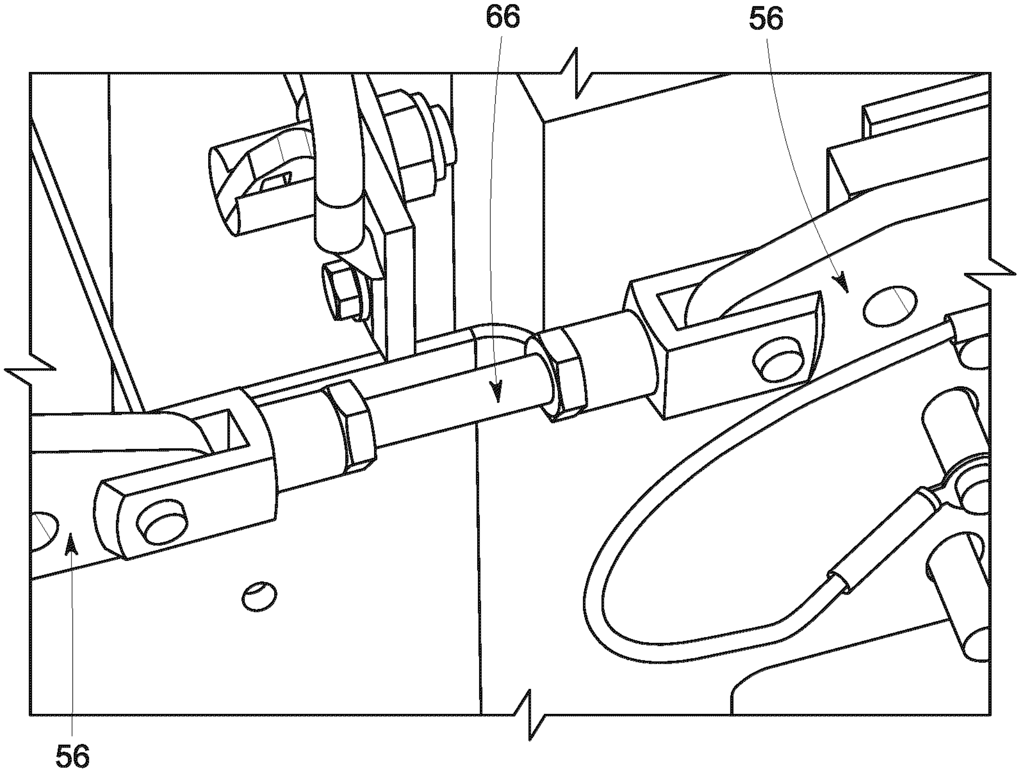
Figure 18:
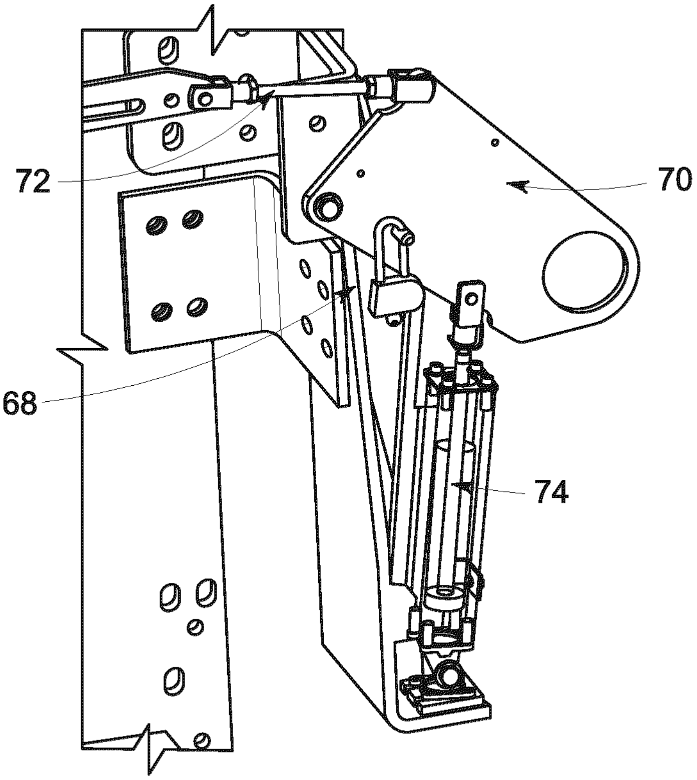

An electrical assembly according to an embodiment of the invention is shown in FIGS. 4 to 6, and close-up views of the components of the electrical assembly are shown in FIGS. 7 to 18.

The electrical assembly comprises a grounding mechanism 54 and a plurality of capacitors 52. Each of the capacitors 52 forms part of a respective one of a plurality of chain-link modules 48. The plurality of capacitors 52 are arranged next to each other in a straight line.

The grounding mechanism 54 includes a plurality of support bars 56 and a plurality of switch contact members 58.

Each support bar 56 is made of fibreglass, but may be made of another insulating material in other embodiments. Each support bar 56 includes two longitudinal slots 60, which are spaced apart from each other and have coaxially aligned longitudinal axes. An output electrical terminal of each capacitor 52 includes an electrical terminal portion 62 that is configured to project through a respective longitudinal slot 60 in a respective support bar 56 so that the electrical terminal portion 62 is slidable within the longitudinal slot 60.

Each support bar 56 has two of the plurality of switch contact members 58 mounted thereon. More specifically, in each support bar 56, each of the two switch contact members 58 is mounted at one end of a respective one of the longitudinal slots 60. Each switch contact member 58 includes two contact member limbs 64 arranged to be spaced apart to receive the projecting electrical terminal portion. The mounting of the switch contact member 58 at the end of the longitudinal slot 60 enables the longitudinal slot 60 to guide a sliding movement of the electrical terminal portion 62 into and out of contact with the switch contact member 58. The contact member limbs 64 are arranged on opposing sides of the electrical terminal portion 62 when the two contact member limbs 64 receive the electrical terminal portion 62.

Furthermore, the switch contact member 58 is shaped to have a resilient spring configuration in order to urge the contact member limbs 64 towards the electrical terminal portion 62 when the two contact member limbs 64 receive the electrical terminal portion 62.

The contact member limbs 64 of each switch contact member 58 are dimensioned to be wider than the electrical terminal portion 62 to accommodate the effects of thermal expansion and/or positional tolerances of the capacitors 52 and associated chain-link modules 48, and to endure a minimum of 1000 open-close cycles whilst maintaining a reliable connection to ground. This is to meet the requirements of the International Electrotechnical Commission (IEC) 62271-102 standard for high-voltage switchgear and controlgear.

In use, each switch contact member 58 is configured to be connected to ground.

The above configuration of each support bar 56 permits each support bar 56 to slide between: a respective first position in which the corresponding switch contact members 58 are each separated from the respective electrical terminal portions 62 so that each corresponding switch contact member 58 is electrically disconnected from the respective capacitor 52; and a second position in which the corresponding switch contact members 58 are in contact with the respective electrical terminal portions 62 so that each corresponding switch contact member 58 is electrically connected to the respective capacitor 52. Accordingly, each support bar 56 is capable of selectively grounding and ungrounding the associated capacitors 52 of the chain-link modules 48.

A respective copper block 65 is mounted between a respective support bar 56 and the respective capacitor 52. Each copper block 65 is electrically connected, preferably using a wire cable, to a respective switch contact member 58 that is mounted on the corresponding support bar 56. A slot is formed in one end of each copper block 65 so that the respective electrical terminal portion 62 projects through the slot without contacting the respective copper block 65. Also, each copper block 65 is configured so that, when the respective support bar 56 is in its first position, the other end of each copper block 65 is spaced apart from a further electrical terminal portion 63 of the capacitor 52. Sliding the respective support bar 56 to its second position causes the corresponding copper block 65 to rock so as to contact the further electrical terminal portion 63. As a result, when the respective support bar 56 is in its second position, both electrical terminal portions 62,63 are brought into electrical contact to enable discharging of energy stored in the corresponding capacitor 52.

The grounding mechanism 54 further includes a plurality of link members 66. Each link member 66 is configured to couple two of the plurality of support bars 56 so as to form a chain of support bars 56. Each link member 66 includes a link section that is configured to be adjustable in length so as to modify the distance between the corresponding coupled support bars 56, which permits the accommodation of positional and dimensional tolerances of the capacitors 52 and associated chain-link modules 48.

The electrical assembly further includes a pair of actuators 68, each of which is configured to be operable to selectively apply a driving force to a respective end support bar 58 at a respective end of the chain of support bars 56. Each actuator 68 comprises a force transfer member 70 coupled to the respective end support bar 56 via a link member 72, and further comprises a hydraulic piston 74 with a hydraulic rod 76 that is coupled to the force transfer member 70 so that the hydraulic piston 74 is able to provide a hydraulic driving force via the force transfer member 70 to the respective end support bar 56 so as to facilitate a sliding motion of the chain of support bars 58 so that the support bars 56 are simultaneously slidable between their respective first and second positions.

It will be appreciated that the actuator may be configured as a mechanical actuator including a mechanical drive element that is coupled to the force transfer member so that the mechanical drive element is able to provide a mechanical driving force via the force transfer member to the respective end support bar, or that the actuator may be configured as a pneumatic actuator that comprises a pneumatic piston with a pneumatic rod that is coupled to the force transfer member so that the pneumatic piston is able to provide a pneumatic driving force via the force transfer member to the respective end support bar.

The configuration of the grounding mechanism 54 therefore enables simultaneous grounding of the capacitors 52 for discharging to ground potential, and simultaneous ungrounding of the capacitors 52.

The arrangement of each switch contact member 58 on the respective support bar 56 makes it straightforward to adapt its sliding motion to ensure sufficient electrical isolation between each switch contact member 58 and the respective electrical terminal portion 62 when grounding is not required, and readily enable the movement of each switch contact member 58 to come into contact with the respective electrical terminal portion 62 when grounding is required. This results in a robust grounding mechanism 54 that enables each capacitor 52 to be discharged safely without causing a dangerous failure of the electrical assembly.

In addition, the provision of each support bar 56 sliding between the first and second positions provides a highly visible and accurate representation of the status of the open or closed position of the switch contact member. This in turn enables an operator to visually check from a safe distance, e.g. 12 metres, whether the capacitor 52 is grounded before approaching the capacitor 52.

Figure 19:
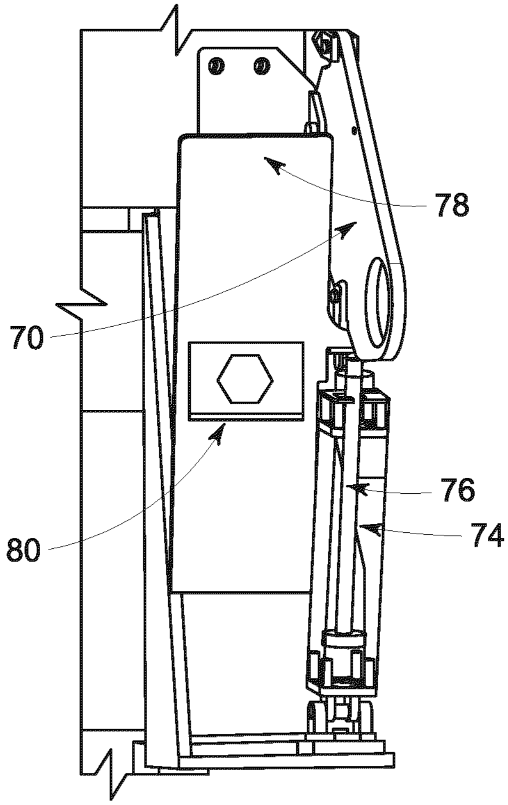
FIGS. 19 and 20 respectively show operations of an actuator to facilitate ungrounding and grounding of a plurality of capacitors of the electrical assembly of FIGS. 4 to 6.
Figure 20:
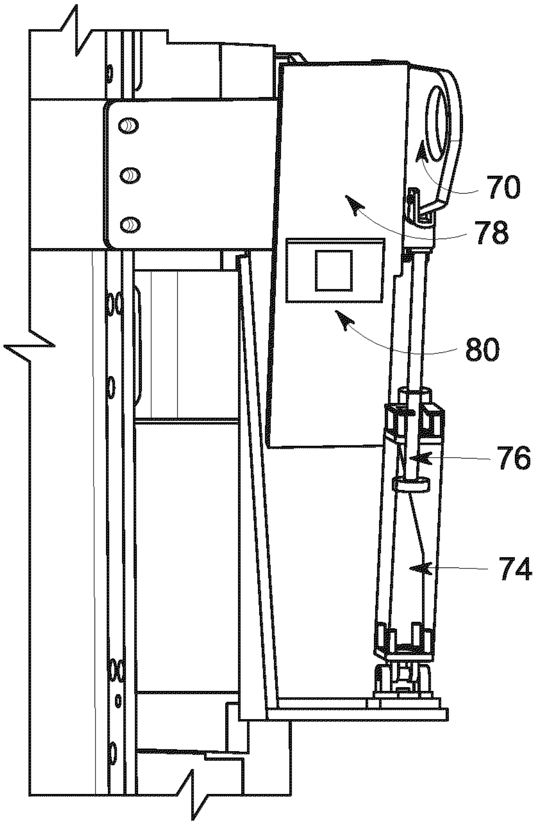

Furthermore, visual symbols can be incorporated to help the operator visually check from a safe distance whether the capacitors 52 are grounded or ungrounded. Exemplarily, a respective sliding panel 78 is coupled to a respective one of the hydraulic rods 76 at the ends of the series of support bars 56. Each sliding panel 78 is coupled to the corresponding hydraulic rod 76 so that, in use, the sliding panel 78 moves together with the hydraulic rod 76. The sliding panel 78 includes a window 80 through which a visual symbol can be observed. In FIG. 19, when the support bars 56 are in their first positions, the sliding panel 78 is positioned so that the window 80 overlays a 'hexagon' symbol on a dark-coloured panel, which indicates the ungrounded state of the capacitors 52. In FIG. 20, when the support bars 56 move to their second positions, the sliding panel 78 is repositioned so that the window 80 overlays a 'square' symbol on a light-coloured panel, which indicates the grounded state of the capacitors 52. Other types of visual symbols may be used depending on the local safety regulations of each country.

It is straightforward to remove the grounding mechanism 54 from the capacitor 52 prior to maintenance or repair, and to reinstall the grounding mechanism 54 on the capacitor 52 after completing the maintenance or repair, because each switch contact member 58 is attached to the respective support bar 56. That is to say, each switch contact member 58 is removable and installable together with the respective support bar 56.

The invention claimed is:

1. An electrical assembly comprising a grounding mechanism and an electrical device, the grounding mechanism including a support longitudinal member and a switch contact member, the switch contact member arranged in or on the support longitudinal member, the switch contact member configured to be connected in use to ground, the electrical device including an electrical terminal, wherein the support longitudinal member is configured to be slidable between: a first position in which the switch contact member is separated from the electrical terminal so that the switch contact member is electrically disconnected from the electrical device; and a second position in which the switch contact member is in contact with the electrical terminal so that the switch contact member is electrically connected to the electrical device, including a plurality of electrical devices, the grounding mechanism including a plurality of support longitudinal members and a plurality of switch contact members, each switch contact member arranged in or on a respective one of the support longitudinal members, each switch contact member configured to be connected in use to ground, each electrical device including an electrical terminal, wherein each support longitudinal member is configured to be slidable between: a respective first position in which the corresponding switch contact member is separated from a respective one of the electrical terminals so that the corresponding switch contact member is electrically disconnected from the respective electrical device; and a second position in which the corresponding switch contact member is in contact with the respective electrical terminal so that the corresponding switch contact member is electrically connected to the respective electrical device, wherein the grounding mechanism includes at least one link member configured to couple a respective one of the plurality of support longitudinal members to a respective other of the plurality of support longitudinal members so that the coupled support longitudinal members are simultaneously slidable between their respective first and second positions, and wherein each link member includes a link section that is configured to be adjustable in length so as to modify the distance between the coupled support longitudinal members.

2. An electrical assembly according to claim 1, including an actuator configured to be operable to selectively apply a driving force to the support longitudinal member so as to slide the support longitudinal member between the first and second positions.

3. An electrical assembly according to claim 1, including a plurality of electrical devices, the grounding mechanism including a plurality of switch contact members, each switch contact member arranged in or on the support longitudinal member, each switch contact member configured to be connected in use to ground, each electrical device including an electrical terminal, wherein the support longitudinal member is slidable between: a first position in which each switch contact member is separated from a respective one of the electrical terminals so that each switch contact member is electrically disconnected from the respective electrical device; and a second position in which each switch contact member is in contact with the respective electrical terminal so that each switch contact member is electrically connected to the respective electrical device.

4. An electrical assembly according to claim 1, wherein the support longitudinal member is in the form of a bar, rod, or beam.

5. An electrical assembly according to claim 1, wherein the support longitudinal member is made of an insulating material.

6. An electrical assembly according to claim 1, wherein the switch contact member includes two contact member limbs arranged to be spaced apart to receive the electrical terminal so that the contact member limbs are arranged on opposing sides of the electrical terminal when the switch contact member is in contact with the electrical terminal.

7. An electrical assembly according to claim 1, wherein a contact portion of the switch contact member is dimensioned to be wider than the electrical terminal.

8. An electrical assembly according to claim 1, wherein the switch contact member is resiliently configured to urge the switch contact member towards the electrical terminal when the support longitudinal member is in the second position.

9. An electrical assembly according to claim 1, wherein the electrical device is an energy storage device.

10. An electrical assembly according to claim 9, wherein the energy storage device is a capacitor.

11. An electrical assembly according to claim 9, wherein the energy storage device is a capacitor of a chain-link module.

12. An electrical assembly comprising a grounding mechanism and an electrical device, the grounding mechanism including a support longitudinal member and a switch contact member, the switch contact member arranged in or on the support longitudinal member, the switch contact member configured to be connected in use to ground, the electrical device including an electrical terminal, wherein the electrical terminal includes an electrical terminal portion configured to extend through a longitudinal slot in the support longitudinal member so that the electrical terminal portion is slidable within the longitudinal slot, and the longitudinal slot is arranged to guide a sliding movement of the electrical terminal portion into and out of contact with the switch contact member, wherein the support longitudinal member is configured to be slidable between: a first position in which the switch contact member is separated from the electrical terminal so that the switch contact member is electrically disconnected from the electrical device; and a second position in which the switch contact member is in contact with the electrical terminal so that the switch contact member is electrically connected to the electrical device.

* * * * *